(12) United States Patent
Giering et al.

(10) Patent No.: US 10,860,879 B2
(45) Date of Patent: Dec. 8, 2020

(54) DEEP CONVOLUTIONAL NEURAL NETWORKS FOR CRACK DETECTION FROM IMAGE DATA

(71) Applicant: United Technologies Corporation, Farmington, CT (US)

(72) Inventors: Michael J. Giering, Bolton, CT (US); Kishore K. Reddy, Vernon, CT (US); Vivek Venugopalan, Bridgewater, NJ (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 16/099,485

(22) PCT Filed: May 16, 2016

(86) PCT No.: PCT/US2016/032696
§ 371 (c)(1),
(2) Date: Nov. 7, 2018

(87) PCT Pub. No.: WO2017/200524
PCT Pub. Date: Nov. 23, 2017

(65) Prior Publication Data
US 2019/0147283 A1    May 16, 2019

(51) Int. Cl.
*G06T 7/00* (2017.01)
*G06F 16/55* (2019.01)
(Continued)

(52) U.S. Cl.
CPC ........... *G06K 9/3241* (2013.01); *G06F 16/55* (2019.01); *G06K 9/00496* (2013.01); *G06K 9/4604* (2013.01); *G06N 5/046* (2013.01); *G06T 7/0004* (2013.01); *G06T 2207/20081* (2013.01); *G06T 2207/20084* (2013.01); *G06T 2207/30164* (2013.01)

(58) Field of Classification Search
None
See application file for complete search history.

(56) References Cited

U.S. PATENT DOCUMENTS

2016/0292856 A1\* 10/2016 Niemeijer ............ G06K 9/4628
2018/0270474 A1\* 9/2018 Liu ........................ A61B 6/508

OTHER PUBLICATIONS

E. Protopapadakis, et al., "Image Based Approaches for Tunnels' Defects Recognition via Robotic Inspectors," Dec. 18, 2015, Network and Parallel Computing; [Lecture Notes in Computer Science; Lect. Notes Computer], Springer Intl Publ, Cham, pp. 706-716.
(Continued)

*Primary Examiner* — Idowu O Osifade
(74) *Attorney, Agent, or Firm* — Cantor Colburn LLP

(57) ABSTRACT

A method includes detecting at least one region of interest in a frame of image data. One or more patches of interest are detected in the frame of image data based on detecting the at least one region of interest. A model including a deep convolutional neural network is applied to the one or more patches of interest. Post-processing of a result of applying the model is performed to produce a post-processing result for the one or more patches of interest. A visual indication of a classification of defects in a structure is output based on the result of the post-processing.

20 Claims, 7 Drawing Sheets

(51) Int. Cl.
G06N 5/04 (2006.01)
G06K 9/32 (2006.01)
G06K 9/00 (2006.01)
G06K 9/46 (2006.01)

(56) References Cited

OTHER PUBLICATIONS

International Application No. PCT/US2016/032696 International Search Report and Written Opinion dated Feb. 21, 2017, 12 pages.
J. Masci, et al., "Steel Defect Classification with Max-Pooling Convolutional Neural Networks," WCCI 2012 IEEE World Congress on Computational Intelligence, Jun. 10-15, 2012, pp. 1-6.
K. Makantasis, et al., "Deep Convolutional Neural Networks for Efficient Vision Based Tunnel Inspection," 2015 IEEE International Conf. on Intelligent Computer Coummunication and Processing, Sep. 3, 2015, pp. 335-342.

* cited by examiner

DEEP CONVOLUTIONAL NEURAL NETWORKS FOR CRACK DETECTION FROM IMAGE DATA

CROSS REFERENCE TO RELATED APPLICATIONS

This is a U.S. National Stage filing of Application No. PCT/US2016/032696, filed on May 16, 2016, the disclosures of which are incorporated herein by reference.

BACKGROUND

This disclosure relates to processing of image data, and more particularly to using deep convolutional neural networks for crack detection from images.

Computer vision systems can apply various image processing algorithms to identify features of interest in one or more captured images. In many object recognition problems, the shape of the object is better for recognition rather than its appearance, which can be dramatically altered, e.g., by painted objects, camouflage and people wearing different clothes. However, shape determination is not the approach for state-of-the-art scale-invariant feature transform (SIFT) based object recognition algorithms.

BRIEF DESCRIPTION

According to an embodiment, a method includes detecting at least one region of interest in a frame of image data. One or more patches of interest are detected in the frame of image data based on detecting the at least one region of interest. A model including a deep convolutional neural network is applied to the one or more patches of interest. Post-processing of a result of applying the model is performed to produce a post-processing result for the one or more patches of interest. A visual indication of a classification of defects in a structure is output based on the result of the post-processing.

In addition to one or more of the features described above, or as an alternative, further embodiments could include detecting the one or more patches of interest comprises applying a threshold on a percentage of pixels with edges in a given patch.

In addition to one or more of the features described above, or as an alternative, further embodiments could include where the classification distinguishes between normal edges and cracks.

In addition to one or more of the features described above, or as an alternative, further embodiments could include where the post-processing includes aggregating classifications from each of the one or more patches and smoothing the classifications to identify dominant classifications.

In addition to one or more of the features described above, or as an alternative, further embodiments could include where the visual indication includes a classification heat map overlaid upon the image data to highlight location and severity of the defects.

In addition to one or more of the features described above, or as an alternative, further embodiments could include where the method is performed in part using cloud computing resources.

In addition to one or more of the features described above, or as an alternative, further embodiments could include where the image data is received from a boroscope camera or from a database of images.

In addition to one or more of the features described above, or as an alternative, further embodiments could include where the model is trained using a plurality of image frames including a plurality of defects labeled on a patch or pixel basis.

In addition to one or more of the features described above, or as an alternative, further embodiments could include where the image data includes at least one channel per frame.

According to another embodiment, a system includes a camera or a database of images. The system also includes a processing system operable to detect at least one region of interest in a frame of image data from the camera or the database of images and detect one or more patches of interest in the frame of image data based on detecting the at least one region of interest. The processing system is further operable to apply a model including a deep convolutional neural network to the one or more patches of interest. The processing system is further operable to perform post-processing of a result of applying the model to produce a post-processing result for the one or more patches of interest and output a visual indication of a classification of defects in a structure based on the result of the post-processing.

Technical function of the embodiments described above includes crack detection in structures as observed in image data.

Other aspects, features, and techniques of the embodiments will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments enable fault detection and classification of damage severity of a structure observed using image data. Captured images of a structure are analyzed for damage or defects in the structure, such as a crack. With a large volume of data from a stream of video images, it is typically difficult to perform crack detection in real-time due to the large overhead of creating and operating registration methods. Embodiments use a deep convolutional neural network (DCNN) to increase the accuracy as compared to conventional computer vision methods and computational burdens of defect detection in structures captured in image data of video streams, for instance, from a boroscope and/or other visual inspection tools.

Figure 1:
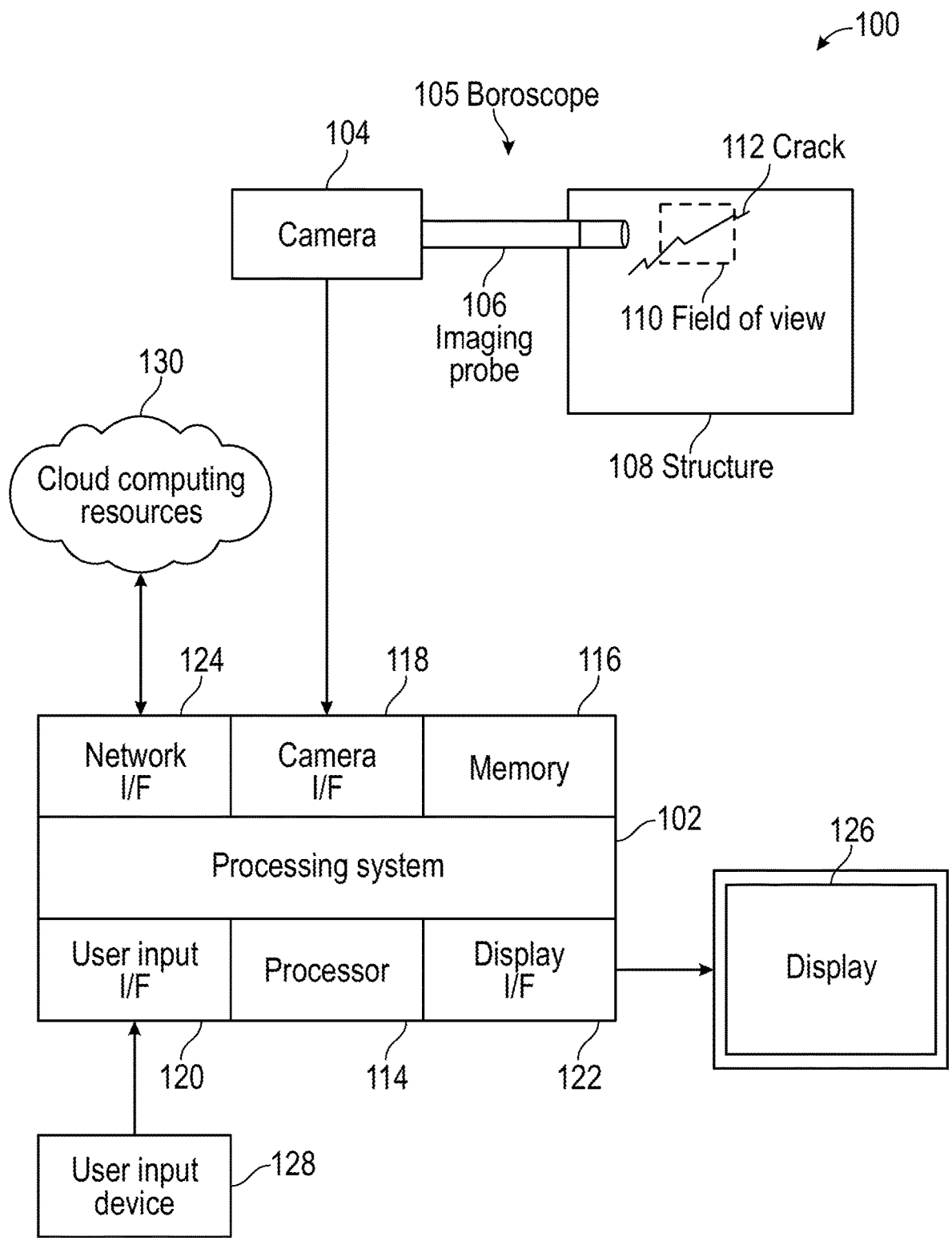
FIG. 1 illustrates a system according to an embodiment.

Referring now to the drawings, FIG. 1 illustrates a system 100 that includes a processing system 102 and a camera 104. The camera 104 can be a boroscope camera of boroscope 105 that uses an imaging probe 106 to analyze a structure 108 within a field of view 110 for defects, such as a crack 112. For example, the structure 108 can be a component of a machine or assembly, such as an airfoil, bearing, gear, shaft, and the like. Image data in the form of frames of video in color (e.g., red (R), green (G), blue (B)) and/or grayscale can be provided to the processing system 102. In some embodiments, the image data captured by camera 104 includes depth information as another channel of data (e.g., an RGB-D camera).

The processing system 102 includes at least one processor 114, memory 116, and a camera interface 118. The processing system 102 can also include a user input interface 120, a display interface 122, a network interface 124, and other features known in the art. The processor 114 can be any type of central processing unit (CPU), including a microprocessor, a digital signal processor (DSP), a microcontroller, an application specific integrated circuit (ASIC), a field programmable gate array (FPGA), or the like. Also, in embodiments, the memory 116 may include random access memory (RAM), read only memory (ROM), or other electronic, optical, magnetic, or any other computer readable medium onto which is stored data and algorithms as executable instructions in a non-transitory form.

The processor 114 and/or display interface 122 can include one or more graphics processing units (GPUs) which may support vector processing using a single instruction multiple data path (SIMD) architecture to process multiple layers of data substantially in parallel for output on display 126. The user input interface 120 can acquire user input from one or more user input devices 128, such as keys, buttons, scroll wheels, touchpad, mouse input, and the like. In some embodiments the user input device 128 is integrated with the display 126, such as a touch screen. The network interface 124 can provide wireless and/or wired communication with one or more remote processing and/or data resources, such as cloud computing resources 130. The cloud computing resources 130 can perform portions of the processing described herein and may support model training.

Figure 2:
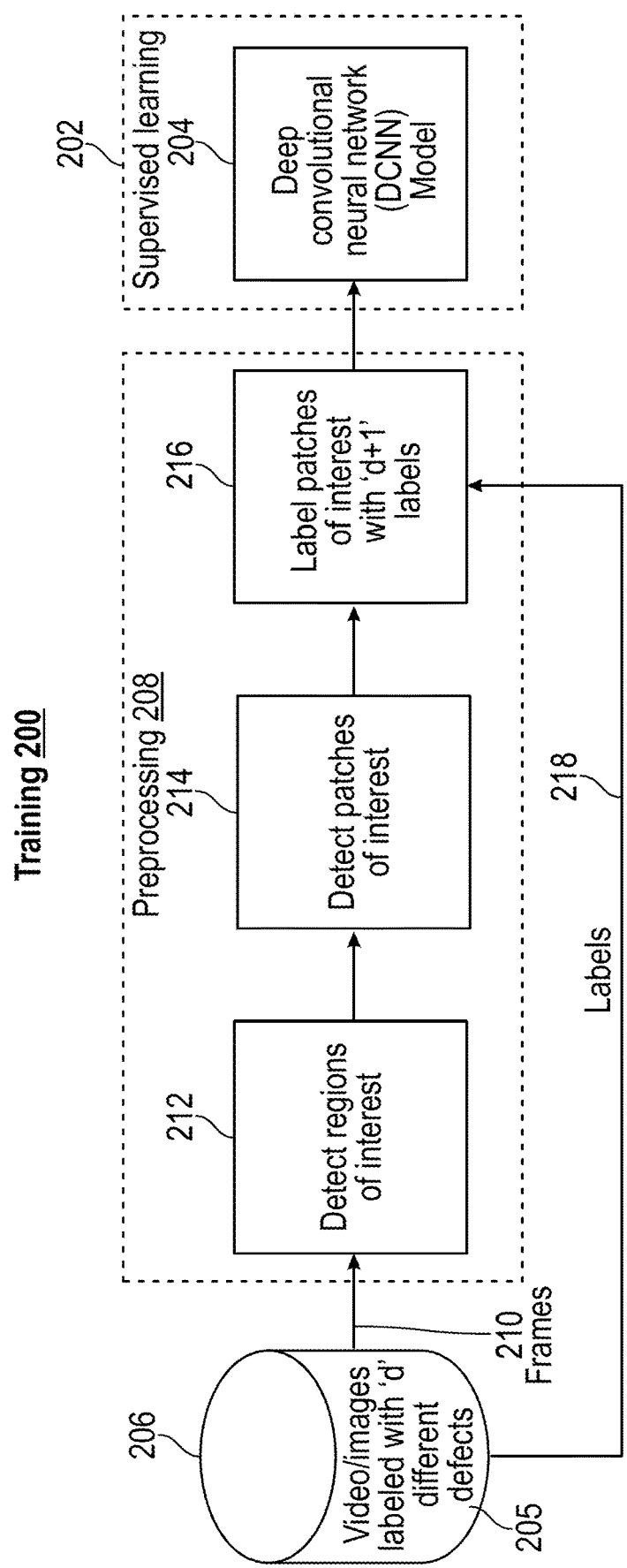
FIG. 2 illustrates a training process using supervised learning to train a model according to an embodiment.

FIG. 2 illustrates a training process 200 using supervised learning 202 to train a model 204 according to an embodiment. In the example of FIG. 2, a data source 206 provides training data 205 to develop the model 204 after preprocessing 208 is performed. The training data 205 in data source 206 can originate from data captured by the camera 104 of FIG. 1 during a training phase. The training process 200 may be performed as part of an off-line process using a separate processing system other than the processing system 102 of FIG. 1. Alternatively, the processing system 102 may be configured in a training phase to implement the training process 200 of FIG. 2.

In the example of FIG. 2, training data 205 includes video/image data labeled with different defects. For purposes of training, sets of images including features labeled as defects are used to train the model 204. Video frame data 210 from training data 205 can be provided to a region-of-interest detector 212 that may perform edge detection or other types of region detection known in the art as part of preprocessing 208. A patch detector 214 can detect patches (i.e., areas) of interest based on the regions of interest identified by the region-of-interest detector 212 as part of preprocessing 208. For example, a threshold can be applied on a percentage of pixels with edges in a given patch. A labeler 216 extracts label data 218 from the training data 205 and applies labels to video data 210 from selected patches of interest as detected by the patch detector 214 as part of preprocessing 208, where labeling can be on a patch or pixel basis. For each selected patch, the labeler 216 applies the label data 218 to the video frame data 210 on multiple channels. If the training data 205 includes two different labels, then the labeler 216 can apply at least one new label normal/undamaged edges). The labeled data from the labeler 216 is used for supervised learning 202 to train model 204 using a convolutional neural network (CNN) which may also be referred to as a deep CNN or DCNN. Supervised learning 202 can compare classification results of the model 204 to a ground truth and can continue running iterations of the model 204 until a desired level of classification confidence is achieved. The preprocessing 208 and training of the model 204 of FIG. 2 are further described with respect to FIGS. 3 and 4.

Figure 3:
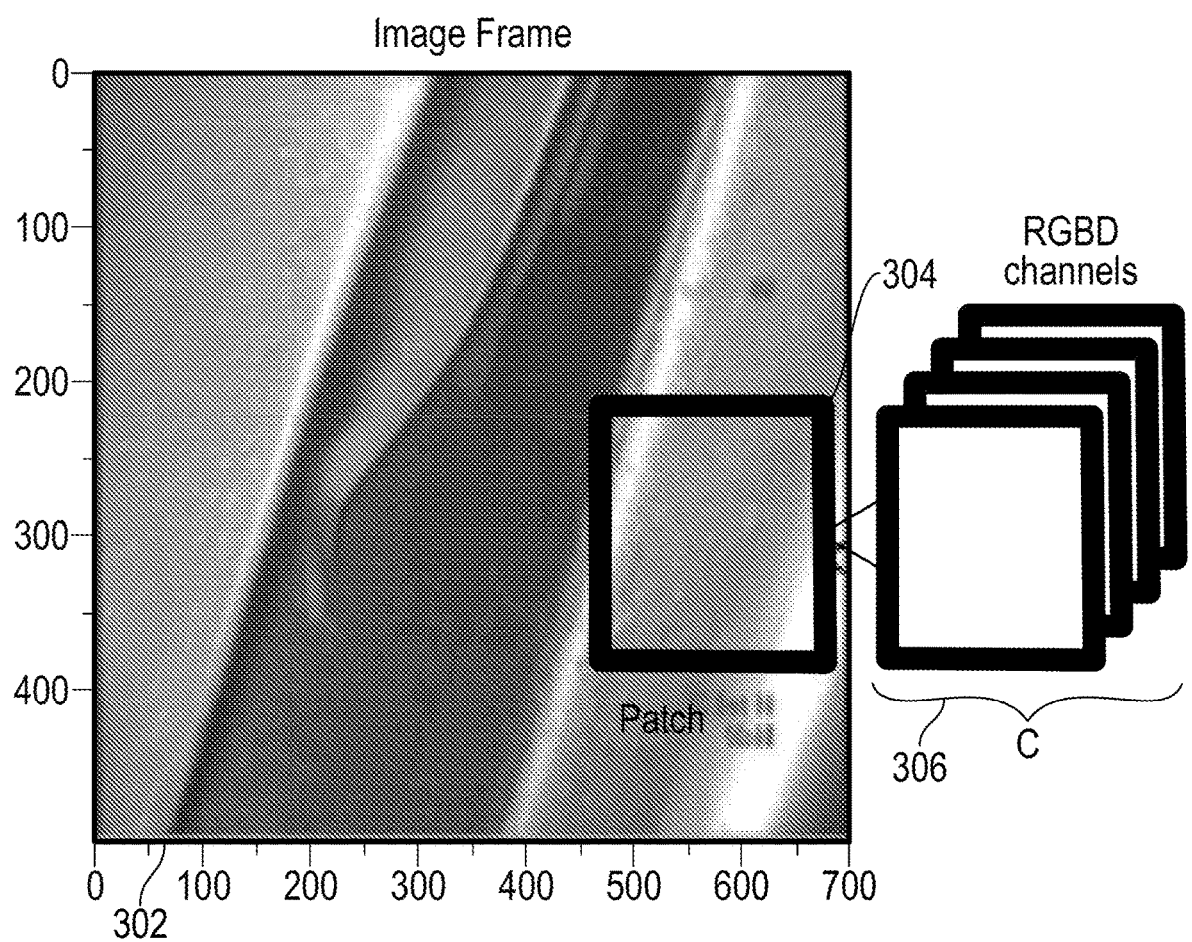
FIG. 3 illustrates a relationship between channels, patches, and images according to an embodiment.

FIG. 3 illustrates a relationship between channels 302, patches 304, and images 306. As one example, at each video frame time step, inputs to preprocessing 208 of FIG. 2 include C channels of data with C ranging from one (e.g., grayscale or depth) to four channels (e.g., RGB-D) 302. The data from in channels 302 can be reshaped to a fixed size (if needed) and partitioned into p×p patches 304 at a prescribed stride. Each p×p patch 304 is stacked across C channels 302, effectively generating a vector of C dimensions. Preprocessing parameters are denoted by patch size p, stride s, and the number of input channels C.

Figure 4:
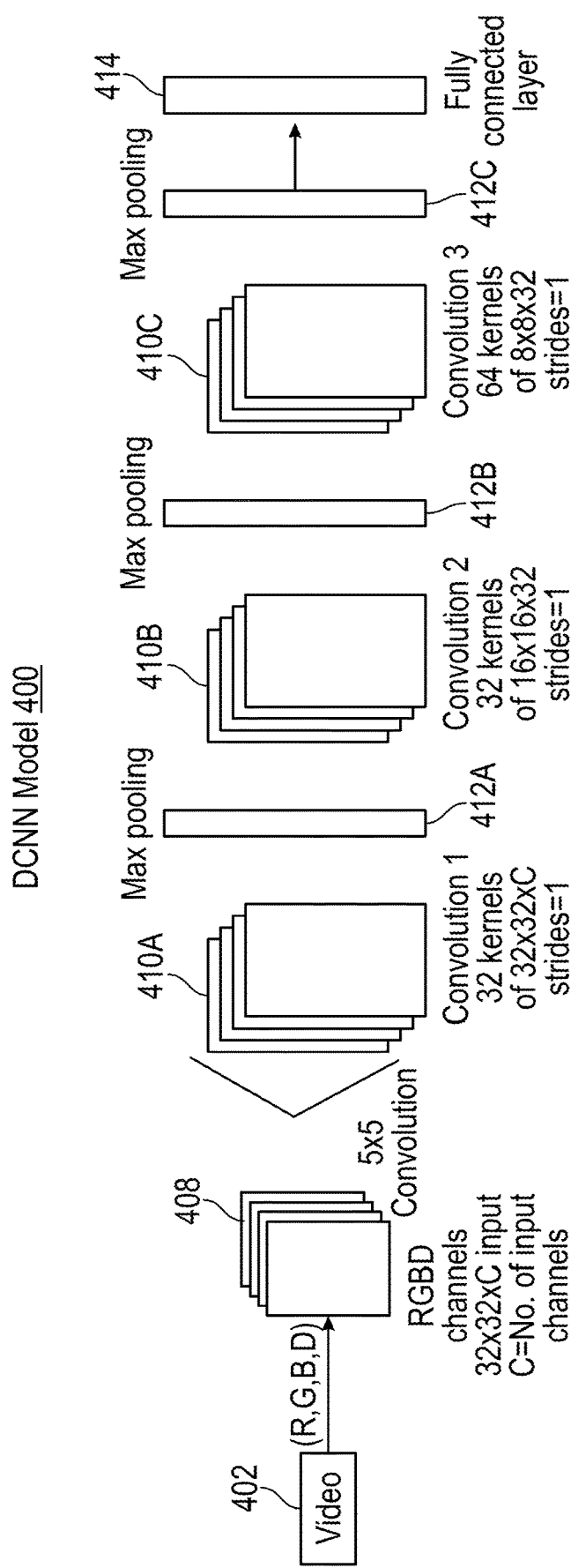
FIG. 4 illustrates a deep convolutional neural network model according to an embodiment.

FIG. 4 illustrates a deep convolutional neural network (DCNN) model 400 according to an embodiment. The DCNN model 400 is an example of the model 204 of FIG. 2. The DCNN model 400 shares weights in the training phase (e.g., training process 200), resulting in fewer model parameters and more efficient training as compared to other machine learning methods. DCNNs in general are particularly useful for problems in which local structure is important, such as object recognition in images and temporal information for voice recognition. Alternating steps of convolution and pooling generate features at multiple scales, which in turn imbue the DCNN model 400 with scale invariant characteristics.

The DCNN model 400 is a feedforward artificial neural network that has more than one layer of hidden units between its inputs and outputs. Each hidden unit, j, uses a nonlinear mapping function, often the logistic function, to map its total input from the layer below, $x_j$, to the scalar state, $y_j$, that it sends to the layer above, where b; is the bias of unit j, i is an index over units in the layer below, and $w_{ij}$ is the weight to unit j from unit i in the layer below. The values of $y_j$ and $x_i$ can be computed according to equation 1.

$$y_j = \frac{1}{1+e^{-x_j}} \text{ where } x_j = b_j + \sum_i y_i w_{ij} \qquad \text{(Equation 1)}$$

For DCNNs, convolution is performed at convolutional layers to extract local structure features from the features of the previous layer. Additive bias is applied at this point. This is followed by a local pooling step. A nonlinear mapping (e.g., a sigmoid) is applied after either the convolution or pooling layer and can vary by implementation. Iteratively repeating the convolution and pooling steps results in a DCNN architecture for DCNN model 400 as illustrated in FIG. 4.

The value for each spatial point (x,y) on the jth feature map in the ith layer is denoted as v according to equation 2, where $b_{ij}$ is the bias for the feature map, m indexes over the set of feature maps in the (i–1)th layer connected to the current feature map, w is the value at the position (p,q) of the kernel connected to the kth feature map, and $P_i$ and $Q_i$ are the height and width of the kernel respectively.

$$v_{ij}^{xy} = \tan h(b_{ij} + \Sigma_m \Sigma_p^{P_i-1} \Sigma_q^{Q_i-1} w_{ijm}^{pq} v_{(i-1)m}^{(x+p)(y+q)}) \quad \text{(Equation 2)}$$

The input to the DCNN model 400 can be a matrix representation of channels 408 from camera 104 of FIG. 2 as video 402. The DCNN model 400 can be created with standard iterative layers of convolution 410 and pooling 412, terminating in a soft-max layer 414 for classification of defects. The soft-max layer 414 is a fully connected layer that enables the edges and defects/cracks to be interpreted as a distribution or as a discrete classification result.

In the example of FIG. 4, the DCNN model 400 includes three pairs of convolution-pooling layers that estimate the defects observed in the video inputs at each time step. The DCNN model 400 outputs to soft-max layer 414, thereby providing a defect classification value for each patch of the frame. Patches, such as patches 304 of FIG. 3, may be implemented as 32×32 patches stacked across the different channels and provided as the input channels 408 to the DCNN model 400. Four channels 408 (RGBD) may be used or fewer/alternate input configurations can be used in embodiments (e.g., RGB, grayscale, and/or depth). As one example, a first convolutional layer 410A uses 32 filters (or kernels) of size 5×5×C with a stride of 1 pixel and padding of 2 pixels on the edges. A first pooling layer 412A generates input data (of size 16×16×32) for a second convolutional layer 410B. The second convolutional layer 410B can use 32 filters of size 5×5×32 with a stride of 1 pixel and padding of 2 pixels on the edges. A second pooling layer 412B, similar to the first pooling layer 412A is used to generate input with size 8×8×32 for a third convolutional layer 410C that uses 64 filters of size 5×5×32 with the stride and padding configured the same as the second convolutional layer 410B. The third pooling layer 412C with a similar configuration as the first and second pooling layers 412A, 412B connects to soft-max layer 414 with labels corresponding to classes generated from the training data. In one embodiment, the DCNN model 400 was trained using stochastic gradient descent with a mini-batch size of 100 epochs. The DCNN model 400 can be configured with Rectified Linear Units (ReLUs) that train several times faster than equivalents with tan h connections.

Figure 5:
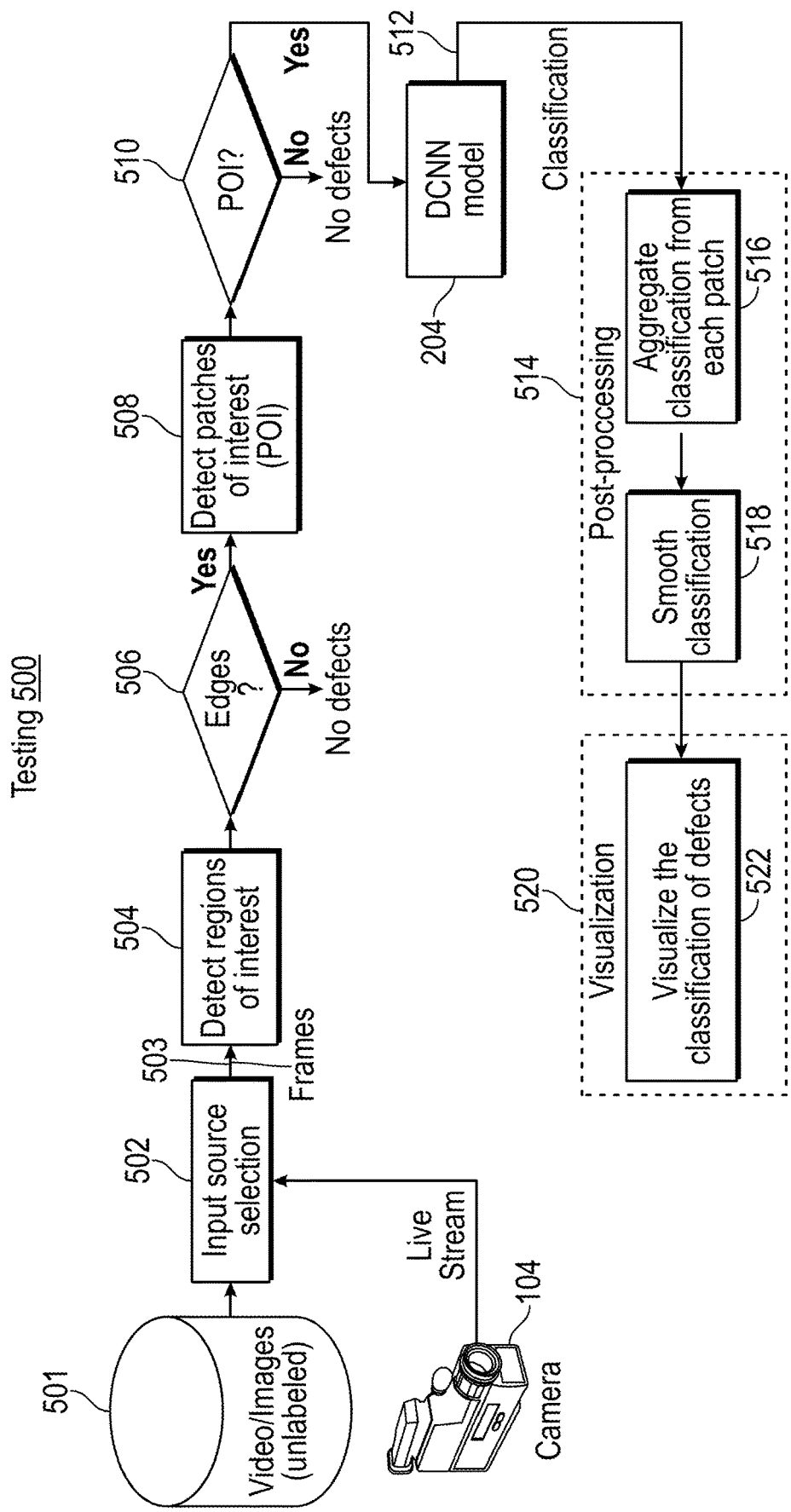
FIG. 5 illustrates a testing process using the model of FIG. 2 according to an embodiment.

FIG. 5 illustrates a testing process 500 using the model 204 of FIG. 2 according to an embodiment. The testing process 500 can be implemented by the processing system 102 of FIG. 1. A live stream from camera 104 can be selected as an input data source or unlabeled video/images from data store 501 can be selected as indicated by input source selection 502 for frames of image data 503. A region-of-interest detector 504 analyzes the frames of image data 503 to detect any regions of interest such as edges. The region-of-interest detector 504 can perform the same operations as the region-of-interest detector 212 of FIG. 2, for instance, using edge detection techniques.

If no edges (and thus no defects) are detected by the region-of-interest detector 504, then block 506 continues processing of the frames of image data 503 as more samples/frames of data are acquired. If at least one region of interest is detected by the region-of-interest detector 504, then block 506 passes the region of interest information to a patch detector 508. The patch detector 508 can perform the same operations as the patch detector 214 of FIG. 2. For example, the patch detector 508 can detect patches (i.e., areas) of interest based on the regions of interest identified by the region-of-interest detector 504. A threshold can be applied on a percentage of pixels with edges in a given patch to reduce the data set size passed to the model 204 trained by training process 200 of FIG. 2.

At block 510, if the patch detector 508 does not detect at least one patch of interest (i.e., no defects), then processing of the frames of image data 503 continues as more samples/frames of data are acquired. If the patch detector 508 detects one or more patches of interest in the frames of image data 503, then the model 204 is applied to the one or more patches of interest using a deep convolutional neural network based on the training process 200 of FIG. 2. In the example of FIG. 5, a result of the model 204 includes classification values 512 that are provided to post-processing 514. The classification distinguishes between normal edges and cracks/defects, for instance.

The post-processing 514 can include aggregating 516 the classification values 512 and smoothing 518 the classification to identify a dominating label representing a defect classification level. When classifications are aggregated from each patch for a given frame, a dominating (i.e., most common) label is used as a final post-processing result for defect classification. At block 520, visualization includes visualizing classification of defects 522 by outputting visual indication of a classification of defects in structure 108, e.g., to display 126, based on the result of the post-processing 514.

Figure 6:
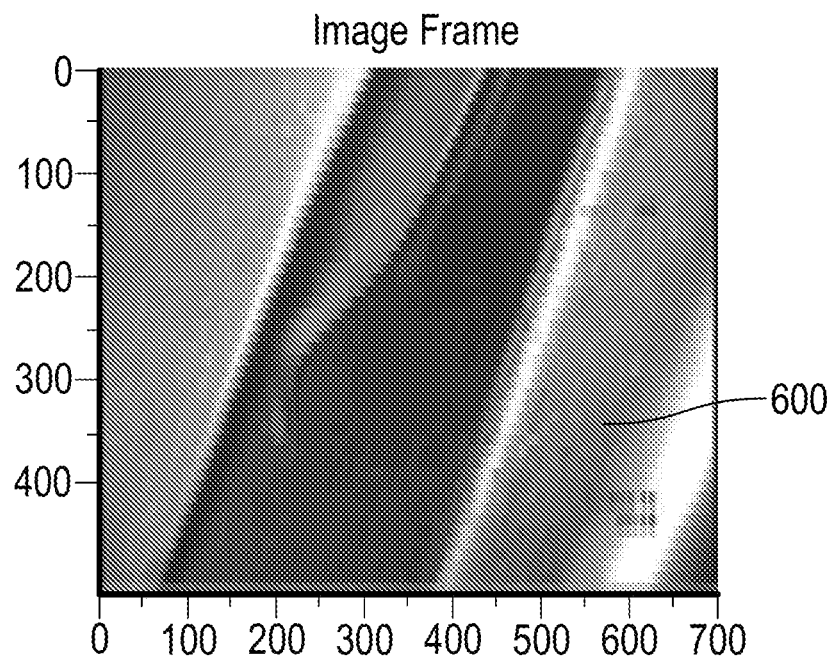
FIG. 6 illustrates an image frame that includes a damaged structure.
Figure 7:
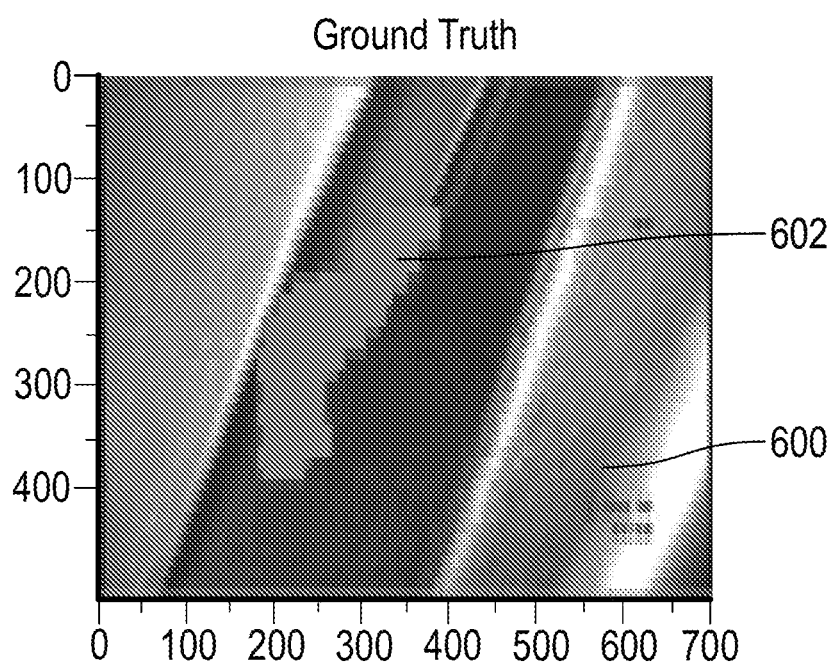
FIG. 7 illustrates an image frame that identifies a ground truth of the damaged structure of FIG. 6.
Figure 8:
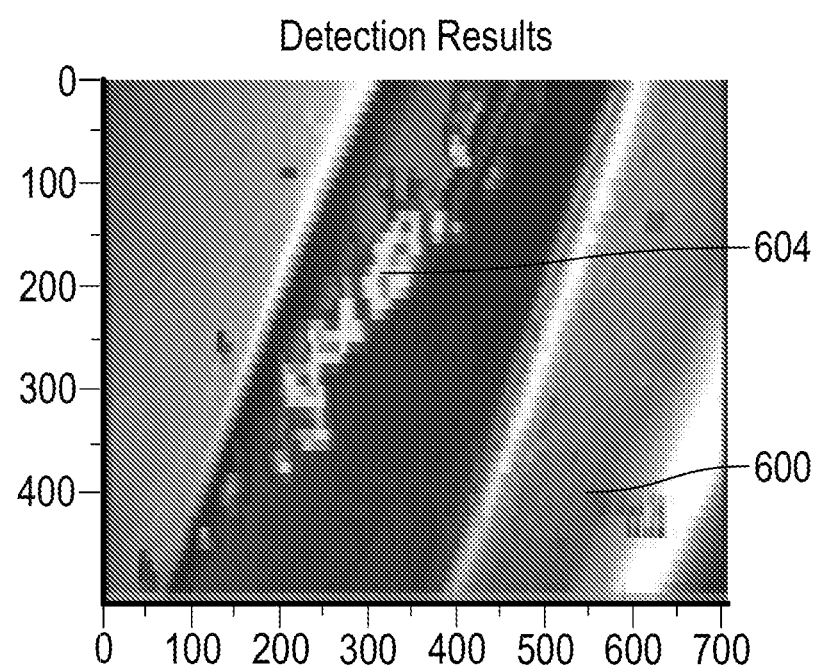
FIG. 8 illustrates an image frame with detection results of the damaged structure of FIG. 6.

FIG. 6 illustrates an example of an image frame that includes a damaged structure 600 that can be viewed using camera 104 of FIG. 1. FIG. 7 illustrates an example of an image frame that identifies a ground truth 602 of the damaged structure 600 of FIG. 6. FIG. 8 illustrates an example of an image frame with detection results 604 of the damaged structure 600 of FIG. 6 as visualized by the testing process 500 of FIG. 5. The visualization of FIG. 8 is in the form of a heat map overlaid upon the image data to highlight location and severity of the defects, where the heat map applies greater intensity defect/crack visualization for areas that are classified with a greater deviation from normal.

The terminology used herein is for the purpose of describing particular embodiments only and is not intended to be limiting of the embodiments. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:
   detecting at least one region of interest in a frame of image data;

detecting one or more patches of interest in the frame of image data based on detecting the at least one region of interest;

applying a model comprising a deep convolutional neural network to the one or more patches of interest;

performing post-processing of a result of applying the model to produce a post-processing result for the one or more patches of interest; and outputting a visual indication of a classification of defects in a structure based on the result of the post-processing, wherein the classification distinguishes between normal edges of the structure and cracks of the structure.

2. The method of claim 1, wherein detecting the one or more patches of interest comprises applying a threshold on a percentage of pixels with edges in a given patch.

3. The method of claim 1, wherein the post-processing comprises aggregating classifications from each of the one or more patches and smoothing the classifications to identify dominant classifications.

4. The method of claim 1, wherein the visual indication comprises a classification heat map overlaid upon the image data to highlight location and severity of the defects.

5. The method of claim 1, wherein the method is performed in part using cloud computing resources.

6. The method of claim 1, wherein the image data is received from a boroscope camera.

7. The method of claim 1, wherein the model is trained using a plurality of image frames comprising a plurality of defects labeled on a patch or pixel basis.

8. The method of claim 1, wherein the image data comprises at least one channel per frame.

9. The method of claim 1, wherein the deep convolutional neural network comprises a plurality of pairs of convolution layers and pooling layers, and at least one of the convolution layers comprises a plurality of kernels with a pixel stride and pixel edge padding.

10. The method of claim 9, wherein the deep convolutional neural network comprises three of the pairs of convolution layers and pooling layers, and a third pooling layer of the pairs is connected to a soft-max layer configured to provide a defect classification value for each of the one or more patches of interest in the frame.

11. A system comprising:
a camera or a database of images; and
a processing system operable to:
detect at least one region of interest in a frame of image data from the camera or the database of images;
detect one or more patches of interest in the frame of image data based on detecting the at least one region of interest;
apply a model comprising a deep convolutional neural network to the one or more patches of interest;
perform post-processing of a result of applying the model to produce a post-processing result for the one or more patches of interest; and
output a visual indication of a classification of defects in a structure based on the result of the post-processing, wherein the classification distinguishes between normal edges of the structure and cracks of the structure.

12. The system of claim 11, wherein detection of the one or more patches of interest comprises application of a threshold on a percentage of pixels with edges in a given patch.

13. The system of claim 11, wherein the post-processing comprises aggregation of classifications from each of the one or more patches and smoothing the classifications to identify dominant classifications.

14. The system of claim 11, wherein the visual indication comprises a classification heat map overlaid upon the image data to highlight location and severity of the defects.

15. The system of claim 11, wherein the processing system interfaces with cloud computing resources to perform a portion of the processing.

16. The system of claim 11, wherein the camera is a boroscope camera.

17. The system of claim 11, wherein the model is trained using a plurality of image frames comprising a plurality of defects labeled on a patch or pixel basis.

18. The system of claim 11, wherein the image data comprises at least one channel per frame.

19. The system of claim 11, wherein the deep convolutional neural network comprises a plurality of pairs of convolution layers and pooling layers, and at least one of the convolution layers comprises a plurality of kernels with a pixel stride and pixel edge padding.

20. The system of claim 19, wherein the deep convolutional neural network comprises three of the pairs of convolution layers and pooling layers, and a third pooling layer of the pairs is connected to a soft-max layer configured to provide a defect classification value for each of the one or more patches of interest in the frame.

* * * * *